(12) United States Patent
Knol

(10) Patent No.: US 7,651,000 B2
(45) Date of Patent: Jan. 26, 2010

(54) SIEVE MATERIAL OF METAL, AND METHOD FOR ITS PRODUCTION

(75) Inventor: Harm Gerrit Knol, Geesteren (NL)

(73) Assignee: Stork Veco B.V., Eerbeek (NL)

( * ) Notice: Subject to any disclaimer, the term of this patent is extended or adjusted under 35 U.S.C. 154(b) by 374 days.

(21) Appl. No.: 11/529,092

(22) Filed: Sep. 28, 2006

(65) Prior Publication Data

US 2007/0075001 A1 Apr. 5, 2007

(30) Foreign Application Priority Data

Sep. 30, 2005 (NL) .................................. 1030081

(51) Int. Cl.
*B01D 71/02* (2006.01)
*B01D 61/00* (2006.01)

(52) U.S. Cl. ..................... 210/500.22; 210/500.25; 210/510.1

(58) Field of Classification Search ................ None
See application file for complete search history.

(56) References Cited

U.S. PATENT DOCUMENTS

| | | | | |
|---|---|---|---|---|
| 4,772,540 A | | 9/1988 | Deutsch et al. | |
| 5,798,042 A | * | 8/1998 | Chu et al. | 210/490 |
| 5,938,923 A | * | 8/1999 | Tu et al. | 210/490 |
| 6,036,832 A | | 3/2000 | Knol et al. | |
| 6,139,674 A | * | 10/2000 | Markham et al. | 156/252 |
| 7,104,406 B2 | * | 9/2006 | Chen et al. | 210/498 |
| 7,143,900 B2 | * | 12/2006 | Hernandez | 210/498 |
| 2004/0028875 A1 | | 2/2004 | Van Rijn et al. | |
| 2005/0133437 A1 | * | 6/2005 | Sibbett | 210/321.84 |
| 2005/0184003 A1 | * | 8/2005 | Rodgers et al. | 210/321.75 |

FOREIGN PATENT DOCUMENTS

| | | |
|---|---|---|
| EP | 0 272 764 | 6/1988 |
| EP | 0 879 635 | 11/1998 |
| NL | 1006118 | 11/1998 |

* cited by examiner

*Primary Examiner*—Krishnan S Menon
(74) *Attorney, Agent, or Firm*—Hoffmann & Baron, LLP

(57) ABSTRACT

The invention provides a substantially flat sieve material of metal with sieve apertures, in particular sieve apertures with microdimensions. The sieve apertures comprise at least one passage in the plane of the sieve material parallel to a main surface, while the inlet and outlet can open onto the same main surface or a different main surface. The invention furthermore provides a method for the production of such sieve material by means of electroforming techniques in which a sacrificial material is used.

5 Claims, 7 Drawing Sheets

SIEVE MATERIAL OF METAL, AND METHOD FOR ITS PRODUCTION

CROSS-REFERENCE TO RELATED APPLICATIONS

This application claims the benefit of Netherlands Application No. NL 1030081, filed Sep. 30, 2005, the contents of which is incorporated by reference herein.

FIELD OF THE INVENTION

According to a first aspect, the invention relates to sieve material of metal with two main surfaces which are situated substantially parallel to each other, the sieve material comprising sieve apertures, in particular a microsieve or microfilter.

BACKGROUND OF THE INVENTION

Microsieves are known in the art. In this description the term "microsieve" is used as a general name for products having apertures with dimensions in the micron or submicron range, irrespective of the use of the product. Such sieve materials are often made of plastic or of ceramic material, for example by means of lithographic techniques. See, for example, WO 02/43937 A2 and NL-1006118 C. In the case of these known flat sieve materials with two main surfaces which are substantially parallel the sieve apertures are through apertures extending in a straight line from the one main surface to the other main surface of the sieve material. In other words, such a sieve aperture has an inlet on one of the two main surfaces and extends linearly through the thickness of the sieve material to the other main surface, where the aperture opens into an outlet.

In the art there is also a need for microsieves made of metal. Conventional electroforming techniques for producing sieves for use in screen printing technology are not adequate for the production of such metal microsieves because the required accuracy of sieve apertures with small cross-sectional dimensions cannot be achieved with those techniques, since the photoresist distribution which largely determines the sieve aperture characteristics is too great or, if use is made of the overgrowth principle (in which metal grows partially over insulating areas on a die), the distribution in the deposited metal thickness is too great to achieve apertures in the micron or submicron range.

The object of the present invention is to provide such sieve material of metal, and also a method for its production.

SUMMARY OF THE INVENTION

According to a first aspect of the invention, the invention provides sieve material of metal with two main surfaces which are situated substantially parallel to each other, the sieve material includes inlets and outlets, an inlet being connected to at least one outlet by at least one passage, which passage is situated in the plane of the sieve material parallel to a main surface. In other words, the sieve material, preferably electroformed sieve material, includes apertures, hereinafter also called sieve apertures, irrespective of the use, an aperture having at least one inlet, at least one outlet and at least one passage connecting the inlet(s) and outlet(s) to each other in the plane of the sieve material parallel to a main surface of said sieve material. A passage is therefore the connecting part which extends parallel to a main surface of said sieve material between the inlet and the outlet. The inlet and the outlet generally extend at right angles to the abovementioned main surface. The inlet and outlet in projection preferably do not exhibit any overlap. The inlet and outlet open on a main surface, either at different main surfaces or at the same main surface.

Unlike the known microsieve materials, in the sieve material according to the invention the sieve apertures are not through apertures with a single main direction, but the sieve apertures include a passage in the plane of the sieve material itself parallel to a main surface. The passage in the plane of the sieve material is in communication with and extends between at least one inlet of the sieve aperture on a main surface of the sieve material and at least one outlet, which can be situated on the same main surface or on the opposite side of the substantially flat sieve material. If desired, the passage at one end or both of its ends can be in communication with one or more dead-end channels. Such dead-end channels are likewise situated in the plane of the sieve material, but do not adjoin an inlet and outlet; they adjoin only one or the other. The height of the passage determines the sieve properties of the sieve material according to the invention, while the overall thickness of the sieve material itself can be selected as desired. In other words, the mechanical strength of the sieve can be adapted to the requirements set by the specific application without changing the sieve (separation) properties. The sieves according to the invention can therefore be subjected to compression and exposed to vibration and/or shocks. In addition, microsieves according to the invention made of a conducting metal can offer advantages for working with compounds which have, for example, dipole moments, by applying a repellent charge or an attractive charge to them.

The height of a passage in the sieve material according to the invention advantageously lies in the range from 10 nanometers upwards, more preferably in the range from 10 nanometers to 10 micrometers.

The sieve material according to the invention is preferably substantially flat. Flat sieve material according to the invention can be bent if necessary. Cylindrical sieve material can also be produced directly using a cylindrical electroforming die.

In a further embodiment of the sieve material according to the invention the passage has a height which, viewed in the thickness direction of the sieve material, is less than the length and/or width of the passage. In general, the passage has a substantially rectangular cross section as a result of the preferred method for the production of the sieve material according to the invention, as will become clear below.

The metal of the sieve material according to the invention is preferably an electroformable metal, more preferably nickel or a nickel-palladium alloy.

The sieve product according to the invention differs from metal foam in the regular nature of the sieve apertures, in particular a uniform height of the passage(s). Metal foam, on the other hand, comprises channels or pores which are not in communication with an inlet and outlet on the surface, and/or dead-end channels. These channels do not all have a passage which is parallel to a main surface. The channels in metal foam do not have a uniform height dimension, so that the strength properties and separation properties can vary from place to place. Furthermore, when the sieve material according to the invention is used as a filter, absolute filtration occurs, while in the case of metal foam, anodizing filters and polymeric filters it is a matter of depth filtration.

According to a second aspect, the present invention provides a method for producing sieve material of metal with sieve apertures. To that end the method according to the invention comprises:

providing an assembly of a first metal layer with a free surface and a growing surface lying opposite it, at least a partial area of a sacrificial material being provided on the growing surface, and the free surface of the metal layer defining a first main surface of the sieve material, and a partial area or a part thereof defining a passage to be formed parallel to the main surface of the sieve material;

applying a second metal layer to the growing surface of the first metal layer and over the partial area of sacrificial material, the free surface of the formed second metal layer defining a second main surface of the sieve material;

at least one inlet being provided in one of the main surfaces, and at least one outlet being provided in one of the main surfaces; and removing the partial area of the sacrificial material through an inlet and/or outlet to form the passage, in order to obtain sieve material of metal with two main surfaces which are situated substantially parallel to each other, the sieve material comprising inlets and outlets, an inlet being connected to at least one outlet by at least one passage, which passage is situated in the plane of the sieve material parallel to a main surface of said sieve material.

The method according to the invention makes it possible to produce the abovementioned sieve material product having sieve apertures not passing straight through. In other words, the inlet and outlet have no common longitudinal axis. Here it is particularly the thickness of the sacrificial layer, which can be deposited as a very thin layer, that determines the ultimate height of the passage of a sieve aperture. The passage is present in the second metal layer. It is thus possible to produce metal sieve products with dimensions of the sieve apertures, in particular the passages thereof, in the submicron range with distributions of at most a few nanometers. In projection perpendicular to a main surface, the inlet and the outlet advantageously do not overlap, so that it is not possible to look directly through from any angle of observation whatsoever. The partial area(s) of the sacrificial material can be applied directly to the metal layer, for example by means of patterning such as lithography (by mask exposure of photoresist and developing) or by means of a laser, or indirectly by first applying a continuous layer of sacrificial material to the metal layer and then forming the one or more partial areas by removing sacrificial material.

In this method according to the invention an assembly comprising a first metal layer with a partial area of a sacrificial material on a main surface thereof is used as the starting material. This main surface is also sometimes called a growing surface in this description, because a second metal layer is applied to it in subsequent steps of the process. The opposite free surface, on which no metal is deposited, is called the main surface of the final sieve material. The second metal layer is deposited on the growing surface of the first metal layer. This deposition is continued until the partial area of sacrificial material is also covered by metal. In the intermediate product thus obtained the partial area of sacrificial material is fully enclosed by other material. At least one recess is then made up to the partial area in a main surface, which recess defines an inlet. At least one outlet is formed in a main surface in a comparable manner. It will be understood that when an inlet and/or outlet is being formed in the main surface of the first metal layer the recess concerned (filled up if desired) can already be present in the assembly, or can be made in it prior to the deposition of the second metal layer. Said recesses can be made by, for example, cutting, drilling, using a laser, etching etc. The recesses are preferably formed by electroforming, as will be explained below.

In a preferred embodiment the method according to the invention comprises the steps of:

a) providing an assembly of a continuous layer of a sacrificial material which is selectively removable, and of a first layer situated thereupon of a conducting metal which is different from said sacrificial material, the layer of conducting metal having at least one aperture extending through the layer in the thickness direction thereof and filled with a removable filling material;

b) applying and forming at least one area of a removable covering material which is not removable in the manner used for removal of the sacrificial material, to the exposed side of the layer of sacrificial material in a position which in projection has an overlap with the abovementioned aperture in the layer of conducting metal;

c) selectively removing the exposed sacrificial material;

d) removing the area of removable covering material from the remaining sacrificial material;

e) applying at least one area of removable electrically insulating material in a position which in projection has an overlap with the remaining sacrificial material and has no overlap with the aperture in the first layer of conducting metal;

f) electroforming a second layer of an electroformable metal on the exposed surfaces of the remaining sacrificial material and on the growing surface of the first layer of conducting metal;

g) removing the removable filling material, the removable insulating material and the remaining sacrificial material, in order to obtain sieve material of metal with two main surfaces which are situated substantially parallel to each other, the sieve material comprising sieve apertures, the sieve apertures having an inlet and an outlet which open onto different main surfaces, and comprising at least one passage in the plane of the sieve material parallel to a main surface between an inlet and an outlet.

In a first step of this embodiment of the method according to the invention an assembly, in particular a flat assembly, is provided, which assembly comprises a continuous or solid layer of a sacrificial material and a first layer of an electrically conducting metal, the electrically conducting metal and the sacrificial material not being the same. This first layer has a free surface which defines a main surface of the final sieve material, and a growing surface which in this phase of the method is completely covered with a sacrificial material. The sacrificial material is, for example, a pyrolyzable organic material such as photoresist (which can, however, also be removed by dissolving in a suitable solvent), more preferably a conducting sacrificial material. Said sacrificial material is, in addition, selectively removable in relation to the conducting metal, for example by means of a selective removing agent such as a selective etching agent in the case of a metal sacrificial material. On this layer of a sacrificial material the layer of a conducting metal which is different from the abovementioned sacrificial material is present. At least one aperture is provided in this layer of a conducting metal, extending through the layer in the thickness direction thereof. Said aperture is filled with a removable filling material. In a second step at least one area of a removable covering material which is not removable in the same way as the sacrificial material is applied on the exposed side of the layer of sacrificial material, i.e. on the side on which the layer of conducting metal is not present. This area is applied and formed in such a way that in projection the area shows an overlap with the removable filling material in the aperture in the layer of conducting metal. In a subsequent step the still exposed sacrificial material is selectively removed, for example by pyrolysis or with a selective removing agent, up to the layer of conducting metal. This step thus results in an intermediate product, which comprises said layer of conducting metal with a filled aperture therein which opens onto the free surface (main surface of sieve material), having on it, i.e. on the growing surface, an area of sacrificial material which corresponds to the area of the removable covering material which is still present on the sacrificial material. This area of removable covering material is also subsequently removed. Thereafter, an area of removable electrically insulating material is again applied, in such a way that in projection this area has an overlap with the remaining sacrificial material, but no overlap with the removable filling material in the aperture in the layer of conducting material. A second layer of an electroformable metal is then deposited on the exposed conducting surfaces of the remaining sacrificial material and of the first layer of conducting metal (growing surface) until the desired thickness is achieved. Finally, the removable filling material, the removable insulating material and the remaining sacrificial material are removed, after one another or at the same time. In this way sieve material of metal with sieve apertures is obtained, the sieve apertures of which have at least one passage—obtained through the removal of the sacrificial material—in the plane in the sieve material between an inlet and an outlet, which inlet and outlet open onto different main surfaces.

If necessary, passivating techniques can be used to reduce or prevent undesirable adhesion, for example between the sacrificial layer and the second layer to be electroformed on it. Flash treatments, for example, can be carried out in a corresponding manner in order to activate specifically metal layers, while for the activation of sacrificial material made of plastic it can be advantageous, for example, to sputter a thin layer of electrically conducting metal. In order to form the aperture in the first layer and the aperture in the second layer, which in the finished product form the inlet and outlet respectively, or vice versa, it is preferable to use patternable protecting materials, more preferably relatively thick layers of photosensitive lacquers. The height of an applied material area is greater here than the desired thickness of the layer to be electroformed, so that overgrowth of metal over the area does not occur. Overgrowth techniques are not, however, excluded.

The shape of the aperture, the remaining area of sacrificial material determined by the shape of the area of removable covering material, and the shape of the insulating material can be chosen freely, provided that the conditions relating to the overlapping areas in the various partial steps are met, otherwise no communication between the holes and cavities formed in the various layers is present. It will be understood that the numbers of inlets, outlets and passages can be selected as required. An inlet can be in open communication with a plurality of passages, while a passage in turn can be in open communication with a plurality of inlets and/or outlets.

The assembly used as the starting material in step a) can be obtained in various ways, for example by electroforming the first layer of conducting metal in the usual manner on a die around an area of insulating material which is going to form the abovementioned aperture, after which a thin layer of sacrificial material is deposited on it. The aperture could also be made by means of selective etching of the metal from the abovementioned first layer, and filling with removable filling material.

With a view to the desired accuracy and low tolerance, it is, however, preferable to use a method according to the invention in which the assembly is produced by:

1) applying a layer of sacrificial material to a conducting substrate;
2) applying an area of insulating material at a position of the aperture to be formed;
3) electroforming the first layer of conducting metal on the exposed surface of the layer of sacrificial material; and
4) removing the assembly of the layer of sacrificial material and the first layer of conducting metal from the conducting substrate.

The substrate used can of itself be electrically insulating, such as glass to which a thin metal layer has been applied, for example by sputtering, in order to make the substrate conducting. This conducting layer remains behind on the substrate in step 4. Various techniques exist for applying a layer, in particular a very thin layer of substantially uniform thickness, of sacrificial material to a substrate, such as sputtering, chemical vapour deposition, physical vapour deposition, spin coating etc. These techniques allow a thin layer of sacrificial material to be deposited, for example with a thickness in the range of up to 10 micrometers, preferably 10 nanometers to 5 micrometers. In particular, chromium can be deposited in very thin layers (for example, a few nanometers thick) by sputtering. This thickness determines the ultimate height of the passage of the sieve apertures in the finished sieve material. The layer of conducting metal is subsequently deposited on this layer of sacrificial material by means of conventional electroforming techniques, after which the assembly thus obtained is removed from the insulating substrate.

The filling material, the removable covering material and/or the insulating material are advantageously photoresist (positive or negative), so that conventional patterning techniques can be used for shaping the aperture and the area of insulating covering material on the sacrificial layer and, finally, for forming the area of insulating material for the final electroforming step. In order to ensure that during the patterning of the area of insulating material the photoresist used as the filling material in the aperture does not also dissolve or become damaged, it is preferable to use different types of photoresist for this purpose. Photoresist is usually removed by dissolving in a suitable solvent.

The sacrificial material can be photoresist which if desired is provided with a thin activation layer in order to give sufficient electrical conductivity. The sacrificial material is preferably a conducting metal, more preferably copper or chromium, which in relation to the preferred materials for the layer of conducting metal and/or the electroformable metal, nickel and nickel palladium alloy, is easy to remove selectively by means of etching. Examples of suitable selective etching agents are described in, for example, Safranek, Metal Finishing Guide. For the removal of photoresist it is possible to use, inter alia, KOH, for chromium, for example, HCl, and for copper agents such as $Cr_2O_3/H_2SO_4$. Organic sacrificial materials such as photoresist can also be removed by pyrolysis. For some plastic sacrificial materials laser ablation can be used.

The layer thickness of the sacrificial material advantageously lies in the range of up to 10 micrometers, more preferably in the range from 10 nanometers to 5 micrometers. The layer thickness of the sacrificial material is advantageously less than the maximum length and/or width dimensions of the area of removable material which is applied in step b).

The method described above makes it possible to produce sieve material in which the passages determining the sieve properties can be arranged in many patterns, with or without multiple inlets and outlets. In perpendicular projection the passages can be of many different shapes, rectangular, polygonal, round, oval, tapering, star-shaped etc. A tapering passage, in which the passage broadens from the inlet to the outlet, i.e. in the direction of the filtration (the height is the same throughout the passage), is particularly preferable, with a view to reducing the risk of blockages of the sieve material.

The essence of the method according to the invention described above is the use of a sacrificial layer whose thickness determines the sieve properties of the sieve material. In the embodiment of the method according to the invention described above the inlet and outlet are situated on opposite main surfaces. This is particularly preferred.

The same technique also allows sieve material in which the inlet and outlet are situated on the same main surface to be produced.

In a first variant, to this end, the method comprises the steps of:

01) providing an assembly of a continuous layer of a sacrificial material which is selectively removable, and of a first layer thereupon of a conducting metal which is different from said sacrificial material;
02) applying at least one area of a removable covering material which is not removable in the manner used for removal of the sacrificial material to the exposed side of the layer of sacrificial material;
03) selectively removing the exposed sacrificial material;
04) removing the area of removable covering material from the remaining sacrificial material;
05) applying at least two areas of removable insulating material in positions which in projection have an overlap with the remaining sacrificial material;
06) electroforming a second layer of an electroformable metal on the exposed surfaces of the remaining sacrificial material and the growing surface of the first layer of conducting metal;
07) removing removable insulating material and the remaining sacrificial material, in order to obtain sieve material of metal with two main surfaces which are situated substantially parallel to each other, in which the sieve apertures have at least one inlet and at least one outlet which open onto the same main surface and comprise at least one passage in the plane of the sieve material parallel to a main surface between an inlet and an outlet. In this variant the outlet and inlet are provided in the second layer.

In a second variant the method comprises the steps of:

I) providing an assembly of a continuous layer of a sacrificial material which is selectively removable, and of a layer thereupon of a conducting metal which is different from said sacrificial material, the layer of conducting metal having at least two apertures extending through the layer in the thickness direction thereof, which apertures are filled with a removable filling material;
II) applying at least one area of a removable covering material, which is not removable in the manner used for removal of the sacrificial material to the exposed side of the layer of sacrificial material in a position which in projection has an overlap with the at least two apertures in the layer of conducting metal;
III) selectively removing the exposed sacrificial material;
IV) removing the removable covering material from the remaining sacrificial material;
V) electroforming a second layer of an electroformable metal on the exposed surfaces of the area of remaining sacrificial material and the growing surface of the first layer of conducting metal;
VI) removing the removable filling material and the remaining sacrificial material, in order to obtain sieve material of metal with two main surfaces which are situated substantially parallel to each other, in which the sieve material has sieve apertures which have at least one inlet and at least one outlet which open onto the same main surface, and comprise at least one passage in the plane of the sieve material parallel to a main surface between an inlet and an outlet. In this variant the inlet and outlet are situated in the main surface defined by the first metal layer.

What is stated above on the preferences in the case of the first embodiment of the method is applicable mutatis mutandis to both of the abovementioned variants of the method.

The sieve materials according to the invention can be used for many purposes for which, for example, plastic and/or ceramic filter materials are currently used. In addition, the sieve materials of metals according to the invention possess good mechanical properties, so that said sieve materials can be subjected to greater loads. Examples of possible applications comprise filtration, or microfiltration, of beer, ink, paint, colorants and pigments, particle-size separation, cleansing and/or purification of waste flows, fine dust filter for trapping fine dust particles with dimensions of less than 10 micrometers, in particular less than 2.5 micrometers, soot filters, in particular for diesel combustion flows, microheat exchangers and separation of food components in food modification and food formulation.

BRIEF DESCRIPTION OF THE DRAWINGS

The invention will be explained below with reference to the appended drawing, in which.

DETAILED DESCRIPTION OF THE PREFERRED EMBODIMENT

FIGS. 1-14 show diagrammatically a method for producing sieve material having sieve apertures with microdimensions. These drawings are not drawn to scale, but are intended only for illustration purposes, which applies in particular to the layer thickness of the sacrificial material.

Figure 1:
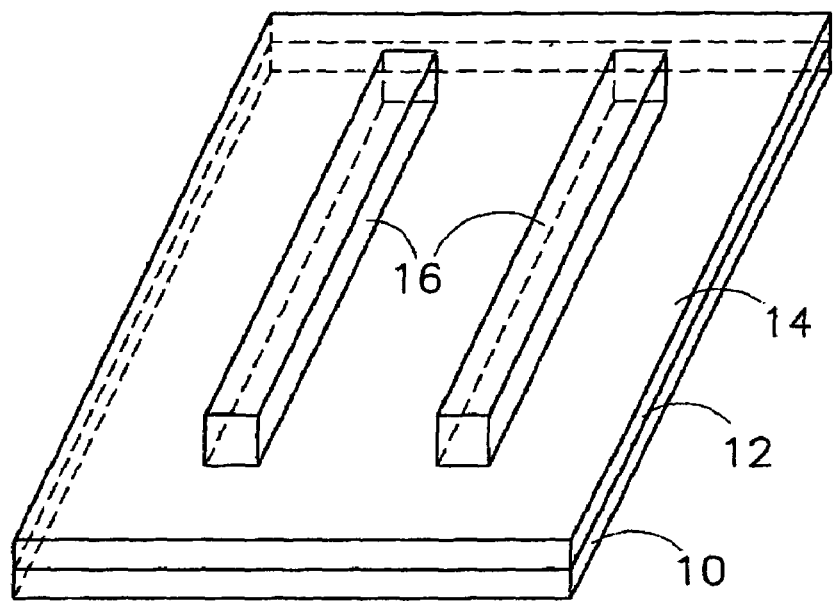
FIGS. 1-14 illustrate a preferred embodiment of the method according to the invention, and also the sieve material obtained by said method.

In FIG. 1 a thin sacrificial layer 12 of sacrificial material such as copper is deposited on a plate-shaped substrate, for example of glass which has been made electrically conducting. A photoresist emulsion is then applied to the free surface 14 of the sacrificial layer 12, which photoresist emulsion is exposed through a mask, after which the exposed parts are washed off, so that the non-exposed parts of photoresist have remained behind on the surface of the sacrificial layer 12. In the embodiment shown the photoresist parts which have not been removed form two elongated strips 16 of square cross section.

Figure 2:
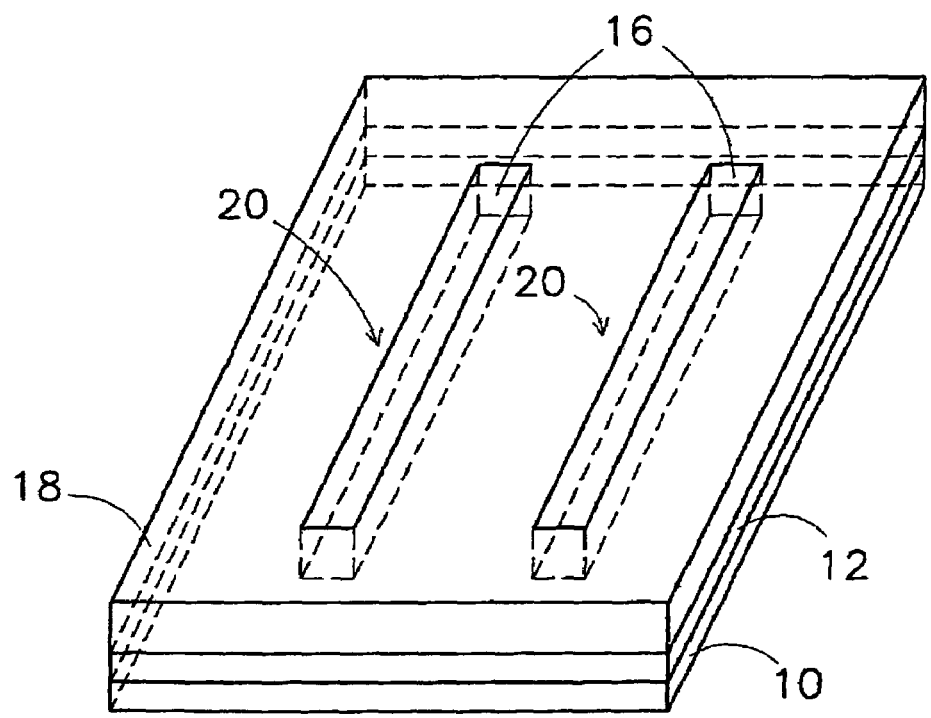

As shown in FIG. 2, by means of electroforming, in which the, in this case inherently conducting, sacrificial layer 12 is connected as the cathode in an electroforming bath, a first layer 18 of conducting metal, nickel here, is deposited, for example from a nickel sulphamate bath, onto the surface 14 around the strips 16. The first layer 18 thus comprises two apertures 20, which in this phase of the method are still filled with the photoresist strips 16. In a subsequent step the assembly of sacrificial layer 12 and first layer 18 containing the apertures 20 still filled with photoresist strips 16 is removed from the substrate 10 and then turned round.

Figure 3:
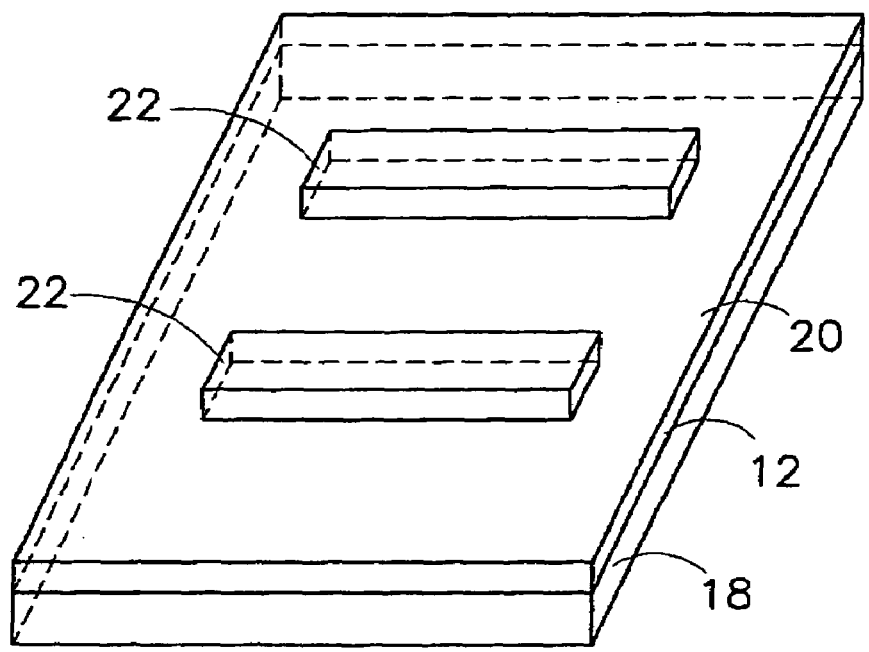
Figure 4:
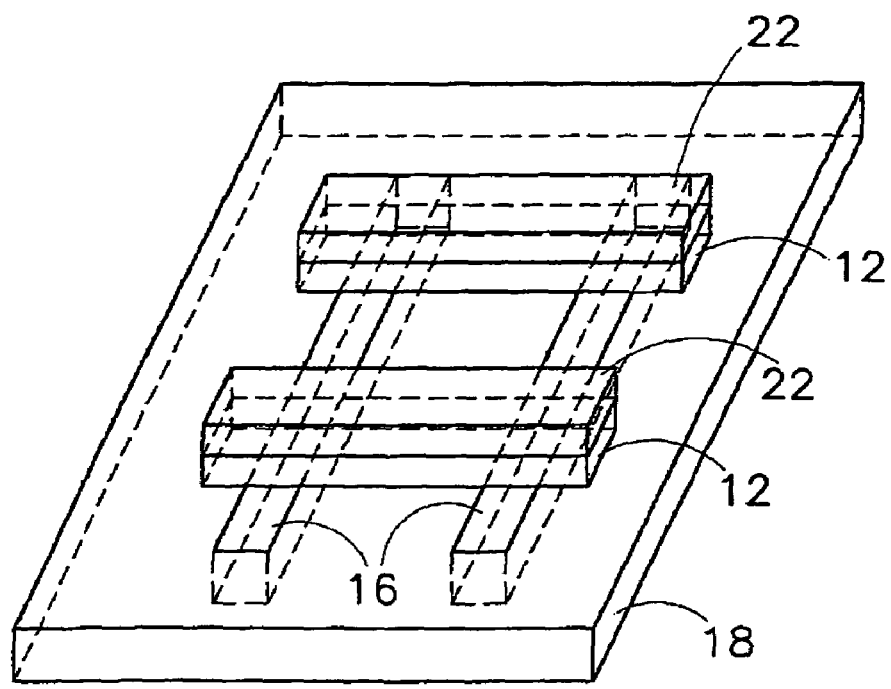
Figure 5:
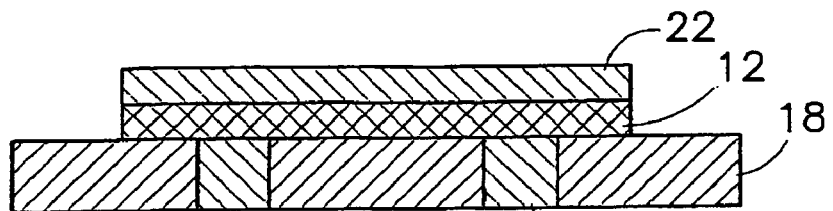
Figure 8:
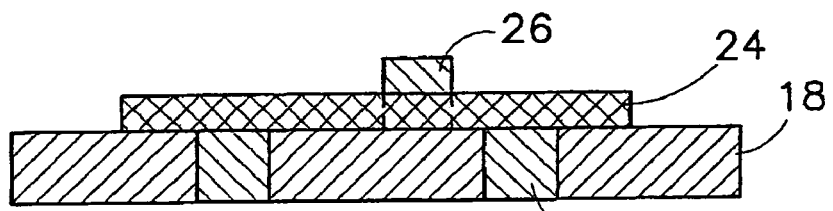
Figure 10:
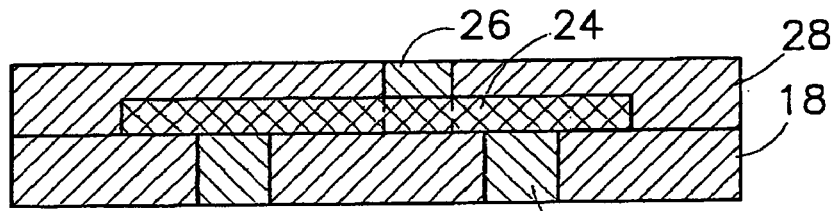
Figure 12:
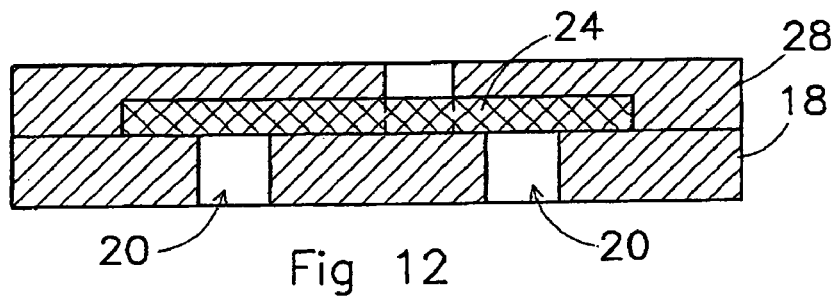
Figure 14:
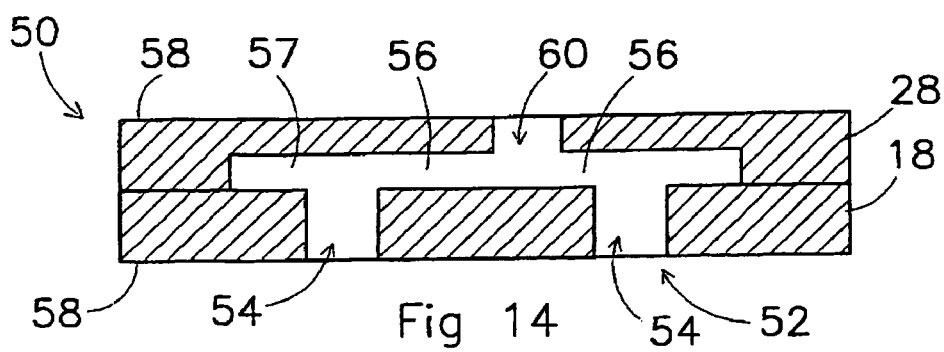

Two areas 22 of removable covering material, here in the form of rectangular areas of photoresist again, are deposited on the free surface 20 of the copper layer 12—see FIG. 3—by means of standard patterning techniques, which two areas partially overlap the apertures 20 (not shown in FIG. 3) or photoresist strips 16 in the first layer 18. See also FIG. 4, to be discussed below. With a selective etching agent, the exposed copper is removed, apart from underneath the photoresist strips 22, up to the first layer 18 and strips 16, so that the intermediate product shown in FIG. 4 is obtained. It can be seen clearly from this figure that the areas 22 of removable covering material and the areas 16 of filling material partially overlap each other. See also the section in FIG. 5. The areas 22 are subsequently also removed, so that remaining partial areas 24 of the copper layer 12 become exposed (see FIG. 6), after which again an area 26 of insulating material such as photoresist is applied by means of patterning techniques, in such a way that this area 26 partially overlaps the remaining partial areas 24 of sacrificial material, but not the strips 16 in the first layer 18 of conducting metal. See FIG. 7 and the section shown in FIG. 8. This complete unit is placed in an electroforming bath, for example the abovementioned nickel sulphamate bath, and connected as the cathode, so that when the current is switched on a second layer 28 of electroformable metal is applied to the exposed conducting surface of both the remaining copper areas 24 and the exposed surfaces (growing surface) of the first layer 18, including overgrowth over strips 16. See FIGS. 9 and 10. The filling material 16 and the insulating material 26 are then removed on either side of the sieve material, for example by means of a suitable solvent, so that the partial area 24 of the copper layer 12 becomes partially exposed and is then etched away with the selective removal agent used earlier. See FIGS. 12-14. In the sieve material thus obtained, indicated in its entirety by reference numeral 50, sieve apertures 52 are present, which sieve apertures in the embodiment shown comprise inlets 54 (compare the apertures 20) in a direction perpendicular to a main surface 58 of the sieve material 50. These inlets 54 are in communication with passages 56 lying in the plane of the sieve material 50, i.e. substantially parallel to the main surfaces 58. These passages are in turn in communication with the outlet 60, which is in a position perpendicular to the other surface 58 of the sieve material 50. In the embodiment shown the passages 56 are in communication with dead ends 57 by way of inlets 54.

Figure 15:
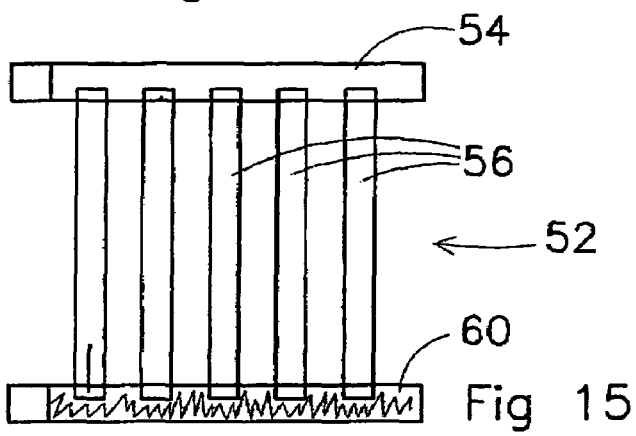
FIGS. 15 and 16 show examples of patterns of the sieve apertures in the sieve material according to the invention.
Figure 16:
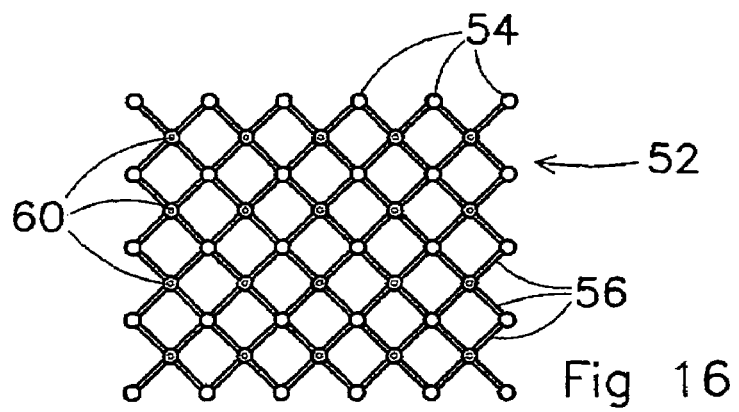

FIGS. 15 and 16 illustrate different patterns of sieve apertures 52 which can be obtained by the method according to the invention. In all these embodiments the sieve apertures 52 comprise a passage 56, which lies in the plane of the sieve material 50. The inlet 54 has no hatching, while the outlet 60 is filled up for the sake of clarity.

By correct positioning of the areas 16, 22 and 26, it is ensured that a direct view through from an inlet 54 to the outlet 56 is not present in the final sieve material.

Figure 6:
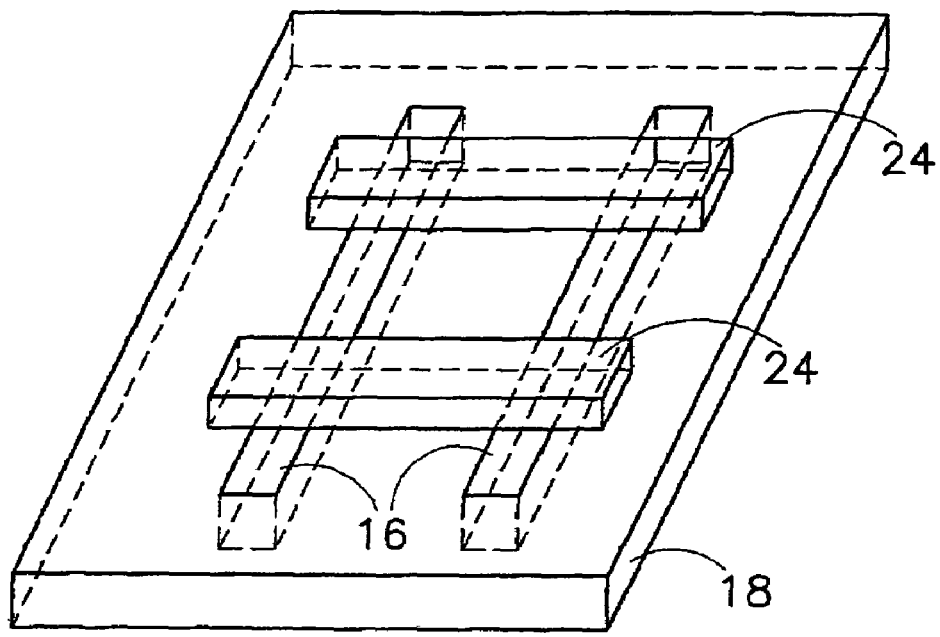
Figure 7:
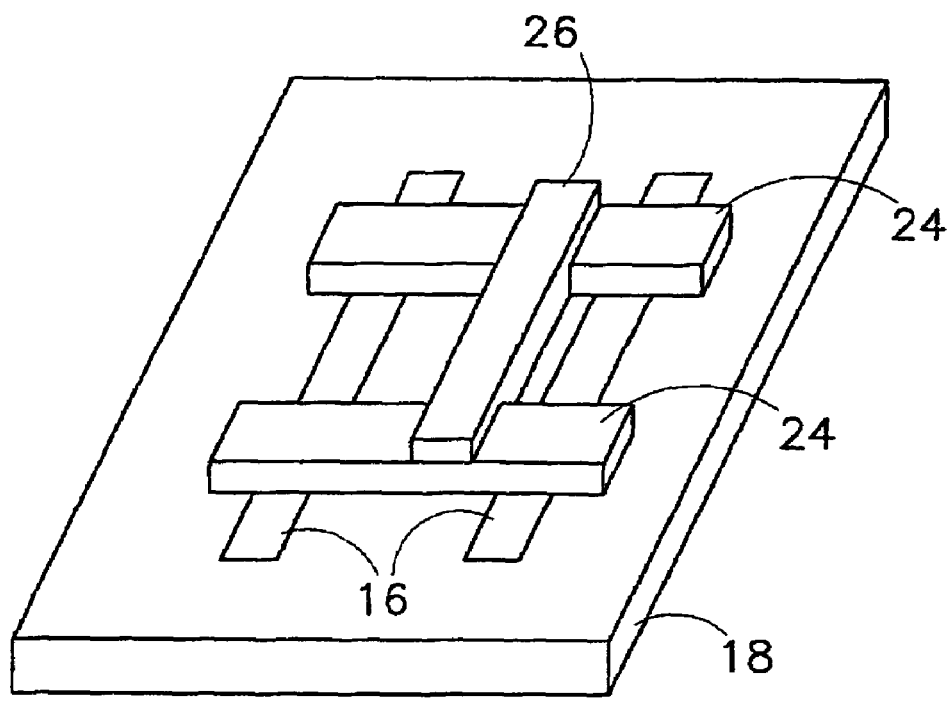
Figure 9:
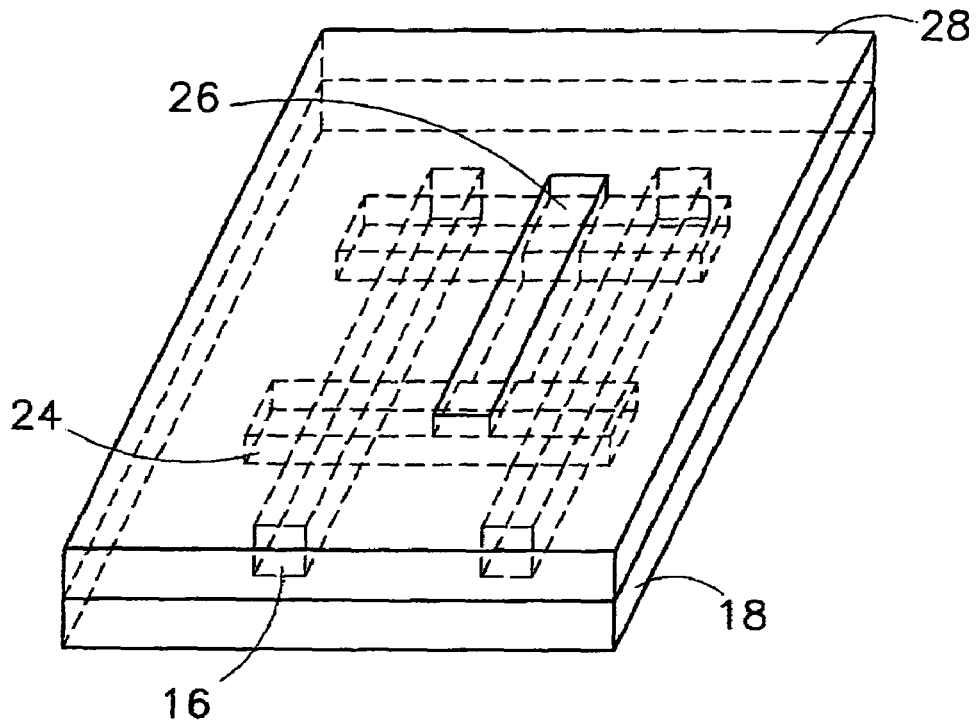
Figure 11:
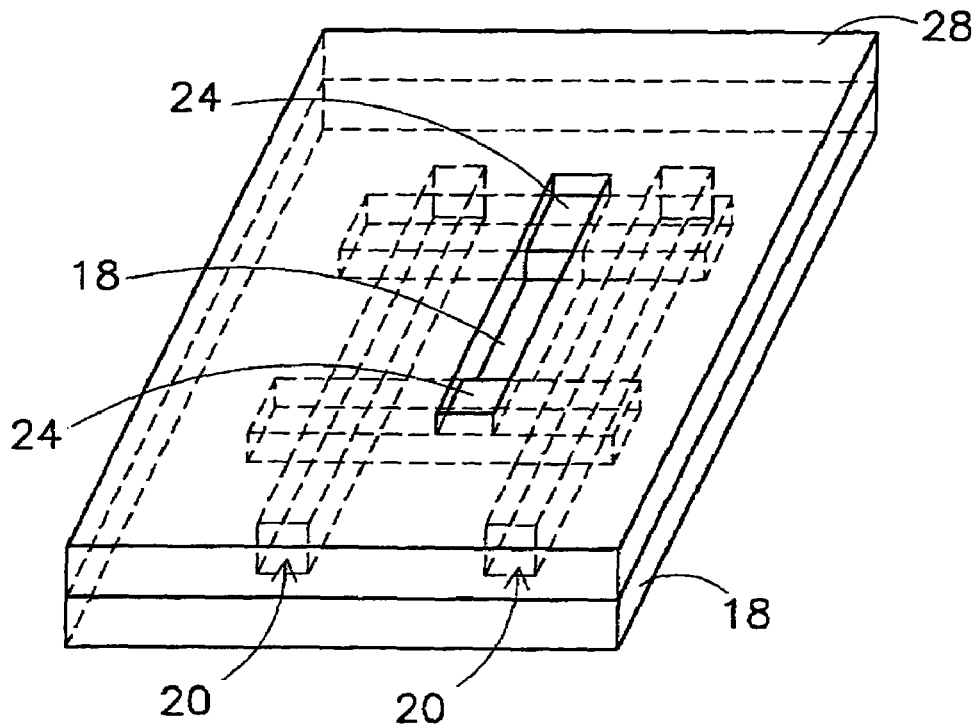
Figure 13:
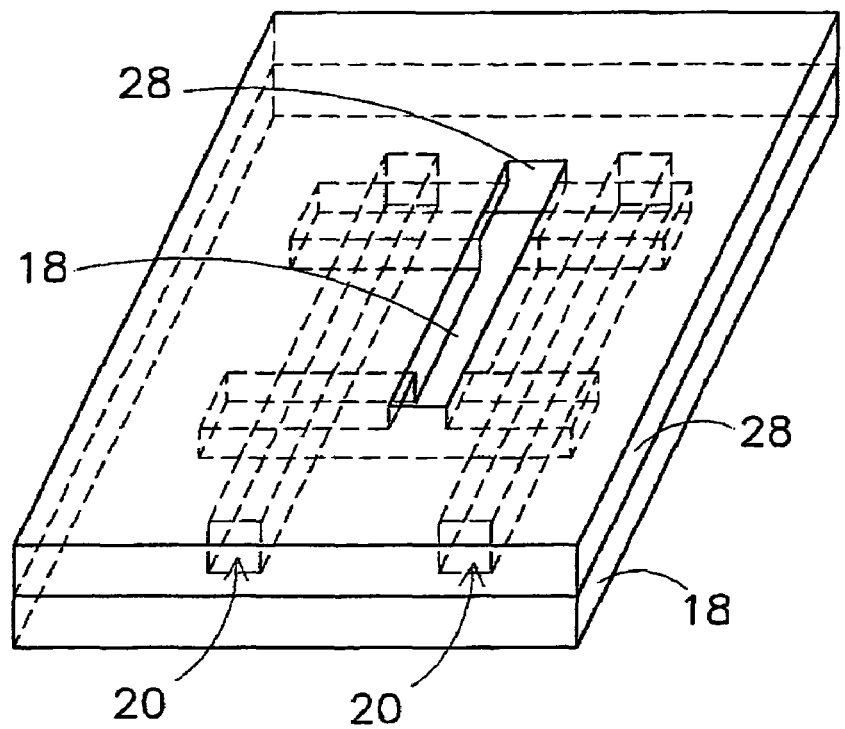

When an inlet and outlet which are connected to each other by means of a passage parallel to the main surfaces of the sieve material have to open onto the same surface, starting from the situation shown in FIG. 6, a second layer of electroformable material can be deposited directly onto the exposed surface of the first layer 18 and the areas 24 of sacrificial material, after which the areas 16 are removed and the areas 24 are then etched away. The sieve material thus obtained comprises sieve apertures in the first metal layer 18 which have an inlet and an outlet which are in communication with each other through a passage.

It is possible in a comparable manner, starting from an assembly of a first continuous layer 18 (see FIG. 6, but then without apertures 20 filled with filling material 16) and areas 24 of sacrificial layer 12 formed thereon, to deposit two areas of insulating material which partially overlap the areas 24 and subsequently to electroform a second layer of electroformable material around those areas of insulating material over the exposed surface of the first layer 18 and that of the areas 24 of the sacrificial layer 12. After removal of the insulator areas and subsequently of the areas 24, a product comprising apertures having an inlet and outlet on the same main surface is obtained. The inlet and outlet are connected to each other by way of a passage parallel to the main surface. See FIG. 18.

Figure 17:
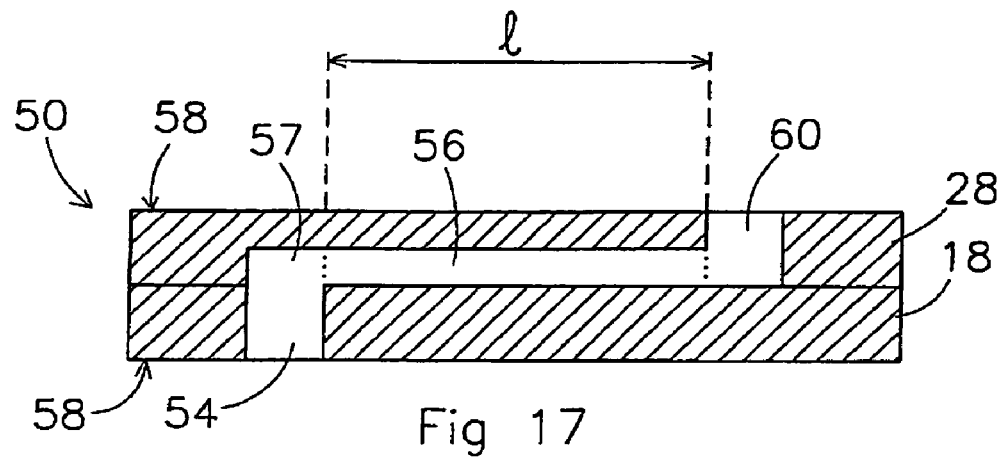
FIGS. 17 and 18 show basic embodiments of the material according to the invention.

FIG. 17 shows a basic embodiment of sieve material 50 according to the invention, in which an inlet 54 is formed in the first metal layer 18, which inlet opens onto a first main surface 58. The inlet 54 is in open communication with the passage 56, which extends in the second metal layer 28, parallel to the main surface 58, to an outlet 60, which opens onto the main surface 58. For the sake of clarity, the ends of the passage 56 are indicated by a dotted line.

Figure 18:
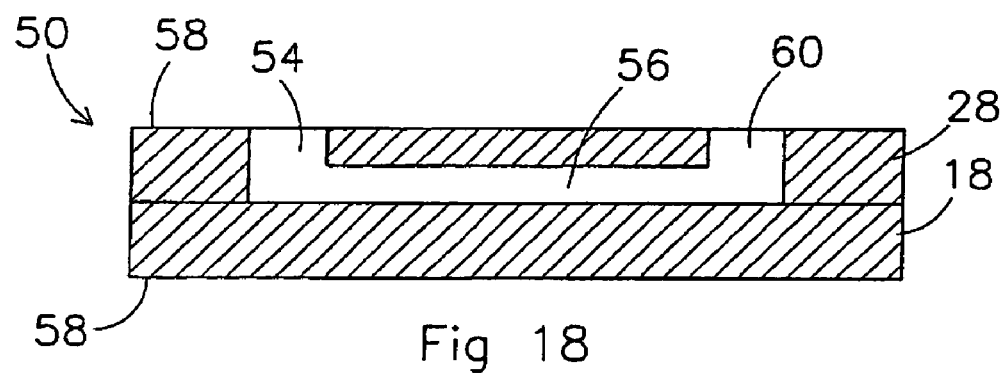

FIG. 18 shows another basic embodiment of sieve material 50 according to the invention, in which the inlet 54 and outlet 60 both open onto the same main surface 58 of the second metal layer 28 and are in communication with each other by way of passage 56, which extends in the second metal layer 28 parallel to the main surface 58.

Figure 19:
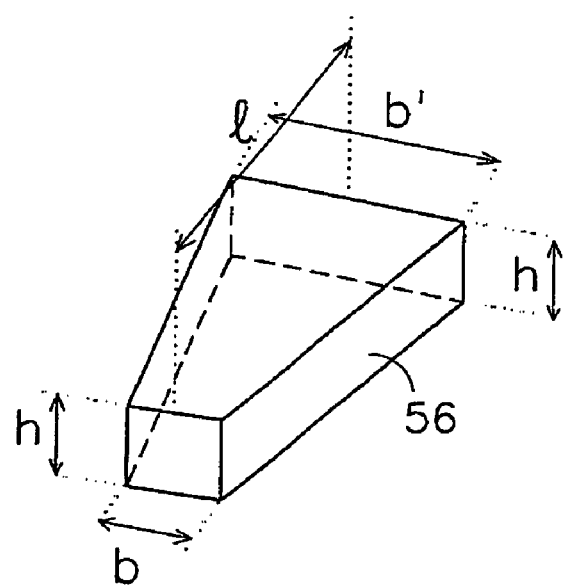
FIG. 19 shows a preferred embodiment of a passage.

FIG. 19 shows diagrammatically a preferred embodiment of a tapering passage 56, which at the end which is in communication with an inlet (not shown), has a width b, and at the other end which is in communication with an outlet (likewise not shown) has a width b' which is greater than width b. The height indicated by h is the same throughout. Said height h determines the sieve properties. "l" indicates the length of the passage. See also FIG. 17.

What is claimed is:

1. Electroformed sieve material of metal or a metal alloy with two main surfaces which are situated substantially parallel to each other, in which the sieve material comprises inlets and outlets, an inlet being connected to at least one outlet by at least one passage having a uniform height dimension, which passage is situated in the plane of the sieve material parallel to a main surface of said sieve material, in which the passage at the end which is in communication with an inlet, has a width b, and at the other end which is in communication with an outlet has a width b' which is greater than width b, wherein the height indicated by h is the same throughout.

2. Sieve material according to claim 1, in which the passage has a height (h) in the range from 10 nanometers upwards.

3. Sieve material according to claim 2, in which the height lies in the range from 10 nanometers to 10 micrometers.

4. Sieve material according to claim 1, in which the passage has a height (h) which, viewed in the thickness direction of the sieve material, is less than the length (l) and/or width (b) of the passage.

5. Sieve material according to claim 1, in which the metal is nickel or a nickel-palladium alloy.

* * * * *

UNITED STATES PATENT AND TRADEMARK OFFICE
CERTIFICATE OF CORRECTION

PATENT NO.        : 7,651,000 B2                                    Page 1 of 1
APPLICATION NO. : 11/529092
DATED             : January 26, 2010
INVENTOR(S)       : Harm Gerrit Knol It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this

Twenty-eighth Day of December, 2010

David J. Kappos
*Director of the United States Patent and Trademark Office*